US006898250B2

United States Patent
Lee et al.

(10) Patent No.: US 6,898,250 B2
(45) Date of Patent: May 24, 2005

(54) WIRELESS COMMUNICATION SYSTEM WITH FEEDBACK AND METHOD THEREFOR

(75) Inventors: Kwang-bok Lee, Seoul (KR); Keun-chul Hwang, Kwangju (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 758 days.

(21) Appl. No.: 09/828,473

(22) Filed: Apr. 9, 2001

(65) Prior Publication Data

US 2002/0006168 A1 Jan. 17, 2002

(30) Foreign Application Priority Data

Apr. 7, 2000 (KR) .......................................... 2000-18313

(51) Int. Cl.$^7$ ............................. H04B 7/02; H04B 1/38
(52) U.S. Cl. ...................................... 375/267; 375/221
(58) Field of Search ............................... 375/267, 259, 375/260, 144, 221, 148, 349, 299, 347

(56) References Cited

U.S. PATENT DOCUMENTS

| 5,634,199 | A |   | 5/1997  | Gerlach et al. |          |
| 5,960,039 | A | * | 9/1999  | Martin et al.  | 375/267  |
| 6,067,324 | A | * | 5/2000  | Harrison       | 375/267  |
| 6,473,467 | B1| * | 10/2002 | Wallace et al. | 375/267  |
| 6,594,473 | B1| * | 7/2003  | Dabak et al.   | 455/101  |
| 6,636,495 | B1| * | 10/2003 | Tangemann      | 370/334  |

OTHER PUBLICATIONS

"Base station transmitting antenna arrays for multipath environments," Gerlach et al., Signal Processing, European Journal Devoted to the Methods and Applications of Signal Processing, Elsevier Science Publishers B.V. Amsterdam, NL, vol. 54, No. 1, Oct. 1, 1996, pp. 59–73.

3GPP, Technical Specification Group Radio Access Network, etc. 3GTS 25214 V3.0.0 (Oct. 1999) pp. 1–39.

IEE Journal on Select Areas in Comminications, vol. 16, No. 8, Oct. 1988, pp. 1451–1458.

* cited by examiner

*Primary Examiner*—Temesghen Ghebretinsae
*Assistant Examiner*—Sam K. Ahn
(74) *Attorney, Agent, or Firm*—Lee, Sterba & Morse P.C.

(57) ABSTRACT

A wireless communication system with feedback and a method therefore, wherein the wireless communication system, which has a plurality of transmitting antennas and a plurality of receiving antennas through which signals are transmitted and received, respectively, includes: a transmitter that restores feedback information from a predetermined feedback signal, weights an information signal with the restored feedback information, and converts the weighted information signal to a radio frequency signal in order to transmit the radio frequency signal; and a receiver that receives the radio frequency signal to estimate the state of a channel, through which the radio frequency signal is transmitted, calculates a weight of a dimensionality corresponding to the number of the transmitting antennas, approximates the weight as lower-dimensional one to extract feedback information, and converts the feedback information into a radio frequency signal to send the radio frequency signal to the transmitter.

20 Claims, 6 Drawing Sheets

FIG. 3

$$\begin{bmatrix} 1 & 0 \\ 0 & 1 \end{bmatrix}$$
(a)

$$\begin{bmatrix} \frac{1}{\sqrt{2}} & \frac{1}{\sqrt{2}} \\ \frac{1}{\sqrt{2}} & -\frac{1}{\sqrt{2}} \end{bmatrix}$$
(b)

$$\begin{bmatrix} 1 & 0 & 0 \\ 0 & 1 & 0 \\ 0 & 0 & 1 \end{bmatrix}$$
(c)

$$\begin{bmatrix} \frac{1}{2} & \frac{1}{2} & \frac{1}{\sqrt{2}} \\ \frac{1}{\sqrt{2}} & -\frac{1}{\sqrt{2}} & 0 \\ \frac{1}{2} & \frac{1}{2} & -\frac{1}{\sqrt{2}} \end{bmatrix}$$
(d)

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$
(e)

$$\begin{bmatrix} \frac{1}{2} & \frac{1}{2} & \frac{1}{2} & \frac{1}{2} \\ \frac{1}{2} & -\frac{1}{2} & \frac{1}{2} & -\frac{1}{2} \\ \frac{1}{2} & \frac{1}{2} & -\frac{1}{2} & -\frac{1}{2} \\ \frac{1}{2} & -\frac{1}{2} & -\frac{1}{2} & \frac{1}{2} \end{bmatrix}$$
(f)

(a)          (b)

WIRELESS COMMUNICATION SYSTEM WITH FEEDBACK AND METHOD THEREFOR

BACKGROUND OF THE INVENTION

1. Field of the Invention

The present invention relates to a wireless communication system with feedback and a method therefore. More particularly, the present invention relates to a wireless communication system which approximates multi-dimensional feedback information as lower-dimensional information to be fed back to a transmitter, and a method therefor.

2. Description of the Related Art

Unlike a wired channel, a wireless channel environment has low reliability due to multipath interference, shadowing, attenuation of radio waves, time-varying noise, and multi-user interference. In particular, due to a multipath fading effect related to movement of a reflector or a user, a desired signal is received with an interference signal and suffers from excessive distortion, thereby significantly degrading the performance of the overall system. To overcome multipath fading, which may be considered as one of the most complicated problems in achieving high-speed data communications through a wireless channel, significant research has been conducted over the past several years. The most effective method for alleviating multipath fading is a diversity technique which receives a plurality of signals that suffer from fading at fingers and combines the outputs of fingers. It is known in the art that this diversity technique exhibits excellent performance in a wireless channel environment. Thus, various methods for exploiting diversity have been proposed and are currently in common use. These methods include time diversity, frequency diversity, and space diversity (antenna) techniques.

In space diversity using multiple antennas, a system for improving downlink performance with multiple receiving antennas at a base station is currently commercialized. Also, uplink performance can be improved with multiple receiving antennas at a terminal. However, due to small power consumption, small size, light weight, and complexity constraints on a terminal, a diversity method for a terminal with a plurality of antennas has many technical limitations. To overcome the above problems, transmit diversity schemes for improving the uplink performance with multiple transmitting antennas at the base station have been suggested. These transmit diversity approaches using multiple transmitting antennas not only improve the link performance by effecting diversity but also provide an economic advantage over adopting multiple receiving antennas to terminals, since a base station serves a plurality of terminals.

Methods of exploiting diversity with multiple transmitting antennas are largely categorized into the following two types: time-space coding without information about channel conditions, proposed by S. M. Alamouti ("A Simple Transmitter Diversity Scheme for Wireless Communication", IEEE J. Select. Areas Comm., Vol 16, pp. 1451–58, Oct. 1998), and feedback of channel condition information from a receiver (3GGP, "Physical Layer Procedures (FDD)", Tech. Spec., Doc. #: 3G TS 25.214 version 3.0.0, Oct. 1999, also available from http://www.3gpp.org). According to a method proposed for a next-generation system in the feedback approach, information about a channel state is obtained from a receiver and optimum antenna weights of multiple transmitting antennas are calculated from the information and fed back to the transmitter. Since an optimum antenna weight depending on a channel state is applied to the multiple transmit antennas, this feedback approach is known to exhibit excellent performance compared with the time-space coding approach. Furthermore, as the number of transmitting antennas increases, the performance is improved in proportion to the increase in number. However, the feedback approach has a drawback in that channel capacity required for feedback must increase in the event of using multiple transmitting antennas since the amount of information required for feedback increases in proportion to the number of transmitting antennas. Furthermore, an increase in the amount of information due to an increase in the number of transmitting antennas increases a time taken for feedback, i.e., a delay time. In this case, a probable change in a channel state during feedback may significantly degrade the performance. Thus, the amount of feedback information is of great concern in exploiting multiple transmitting antenna diversity. In general, there is a limit in the capacity of the channel used for feedback, and a delay increases as much as the amount of feedback information does. Thus, the feedback approach in which a number of transmitting antennas are adopted involves channel capacity restrictions and delay increase. Accordingly, it is highly desirable to reduce the amount of feedback information.

SUMMARY OF THE INVENTION

To solve the above problems, it is a feature of an embodiment of the present invention to provide a wireless communication system which approximates multi-dimensional feedback information as lower-dimensional information to be fed back to a transmitter, and a method therefor.

Accordingly, in accordance with the above feature, the present invention provides a wireless communication system including a plurality of transmitting antennas and a plurality of receiving antennas through which signals are transmitted and received, respectively. The wireless communication system includes: a transmitter that restores feedback information from a predetermined feedback signal, weights an information signal with the restored feedback information, and converts the weighted information signal to a radio frequency signal in order to transmit the radio frequency signal; and a receiver that receives the radio frequency signal to estimate the state of a channel, through which the radio frequency signal is transmitted, calculates a weight of a dimensionality corresponding to the number of the transmitting antennas, approximates the weight as lower-dimensional one to extract feedback information, and converts the feedback information into a radio frequency signal to send the radio frequency signal to the transmitter.

In accordance with another feature of an embodiment of the present invention, there is provided a wireless communication system including a plurality of transmitting antennas and a plurality of receiving antennas through which signals are transmitted and received, respectively. The wireless communication system includes: a transmitter that restores feedback information from a predetermined feedback signal, weights an information signal with the restored feedback information, and converts the weighted information signal into a radio frequency signal in order to transmit the radio frequency signal; and a receiver that receives the radio frequency signal to estimate the state of a channel, through which the radio frequency signal is transmitted, selects a number of basis vectors and their coefficients corresponding to the dimensionality of approximation among the basis vectors whose number corresponds to the number of the transmitting antennas, obtains a plurality of weights from the selected basis vectors and coefficients, extracts a weight that maximizes a predetermined objective function obtained from the channel state among the plurality of weights as feedback information, and converts the feedback information into a radio frequency signal in order to send the radio frequency signal to the transmitter.

In accordance with another feature of an embodiment of the present invention, there is further provided a wireless communication method in which, when M radio frequency signals transmitted from a transmitter are received through multiple paths, feedback information is extracted from the received signals and the feedback information is sent to the transmitter. The method includes the steps of: (a) estimating states of channels comprising the multiple paths from the received signals; (b) calculating a weight, which is fed back into the transmitter and multiplied by the M radio frequency signals, from the channel state; (c) approximating the weight as dimension S which is less than M and quantizing coefficients for the approximated dimension; and (d) feeding basis vectors and their quantized coefficients of the approximated dimension, or indices that identify the basis vectors and their quantized coefficients back to the transmitter.

Another feature of an embodiment of the present invention also provides a wireless communication method in which, when M radio frequency signals transmitted from a transmitter are received through multiple paths, feedback information is extracted from the received signals and the feedback information is sent to the transmitter. The method includes the steps of: (a) estimating states of channels comprising the multiple paths from the received signals; (b) determining basis vectors that represent M dimensions; (c) selecting S basis vectors among the determined basis vectors where S is less than M; (d) selecting one of N quantization coefficients for each basis vector; (e) obtaining feedback information $W_i$ from the selected basis vectors and quantization coefficients; and (f) sending $W_i$ or an index indicating $W_i$ back to the transmitter if a predetermined objective function $P_i$ generated from $W_i$ and the estimated channel H reaches a maximum.

These and other features of the present invention will be readily apparent to those of ordinary skill in the art upon review of the detailed description that follows.

BRIEF DESCRIPTION OF THE DRAWINGS

The above features and advantages of the present invention will become more apparent by describing in detail preferred embodiments thereof with reference to the attached drawings in which:

FIGS. 3(a)–3(f) illustrate examples of basis vector sets required for approximating feedback information;

DETAILED DESCRIPTION OF THE PREFERRED EMBODIMENTS

Korean Patent Application No. 00-18313, filed on Apr. 7, 2000, and entitled: "Wireless Communication System with Feedback and Method Therefor," is incorporated by reference herein in its entirety.

Figure 1:
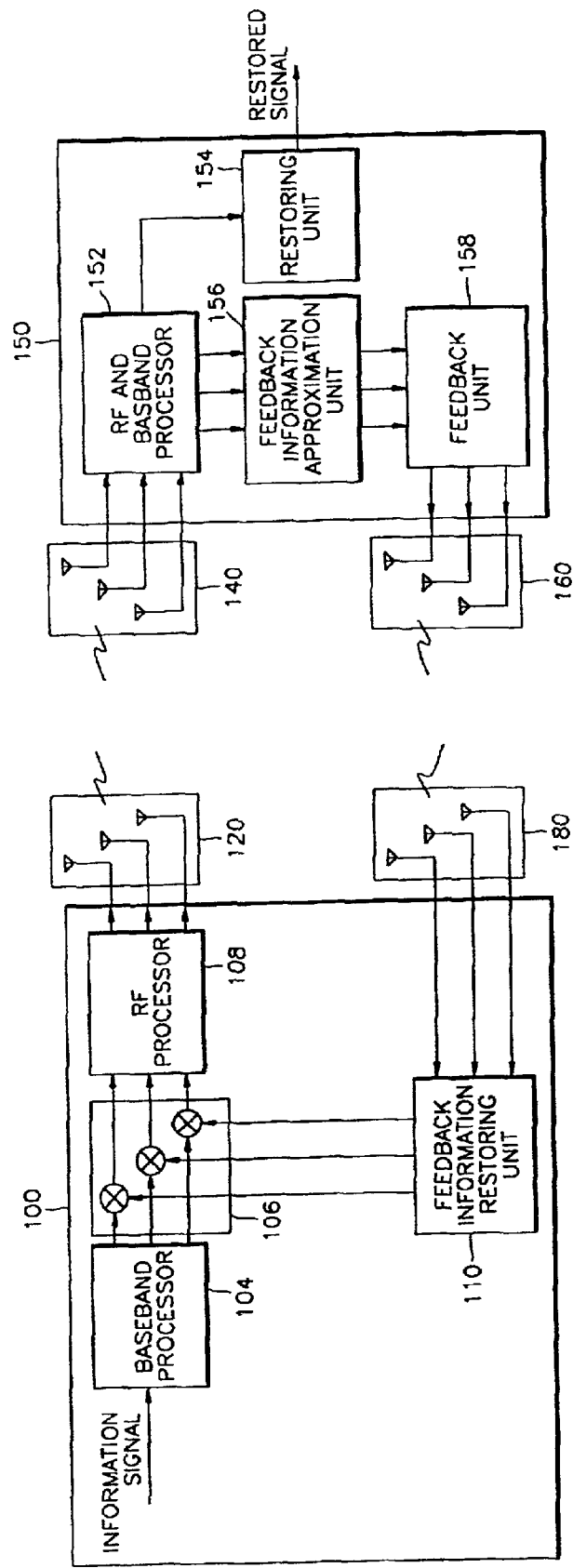
FIG. 1 illustrates a block diagram of a wireless communication system with feedback according to the present invention.

Referring to FIG. 1, a wireless communication system according to the present invention includes a transmitter 100 and a receiver 150. The transmitter includes a baseband processor 104, a weighting unit 106, a radio frequency (RF) processor 108, and a feedback information restoring unit 110. Also, the transmitter 100 includes multiple transmitting/receiving antennas 120 and 180 for transmission/reception of a signal. The receiver 150 includes an RF and baseband processor 152, a restoring unit 154, a feedback information approximation unit 156, and a feedback unit 158. Also, the receiver 150 includes multiple transmitting/receiving antennas 140 and 160 for transmission/reception of a signal.

The baseband processor 104 of the transmitter 100 performs some processes, for example, encoding and modulations on baseband information signals. The weighting unit 106 multiplies feedback information transmitted from the receiver 150 and restored in the feedback information storing unit 110 by the output signal of the baseband processor 104. The RF processor 108 converts the output signal of the weighting unit 106 into a radio band signal to transmit the radio frequency signal through the multiple transmitting antennas 120. The feedback information restoring unit 110 restores feedback information from a feedback signal received through the multiple receiving antennas 180 and outputs the restored information to the weighting unit 106.

The RF and baseband processor 152 of the receiver 150 processes a signal received through the multiple receiving antennas 140, extracts a baseband signal therefrom, and estimates a channel state from the baseband signal. The restoring unit 154 decodes the baseband signal to restore transmit information. The feedback information approximation unit 156 calculates multi-dimensional weight from the estimated channel state and approximates the multi-dimensional weight as lower-dimensional one which is feedback information. The feedback unit 158 converts the feedback information into a baseband signal and then an RF signal and transmits the RF signal through the multiple transmitting antennas 160.

A method of approximating the weights in the feedback information approximation unit 156 and a method of restoring the feedback information in the feedback information restoring unit 110 will now be described.

The feedback information can be obtained by approximating an optimum weight available from the estimated channel state as lower-dimensional one. For example, it is assumed that L multipaths are created by multiple transmitting antennas 120 composed of M antennas and channels. It is also assumed that the multiple receiving antennas 140 includes only a single antenna. Assuming that the L multipath signals are separated in the transmitter 100 and the receiver 150, a channel state H may be expressed by Equation (1):

$$H = \begin{bmatrix} h_{11} & \cdots & h_{M1} \\ \cdots & h_{ml} & \cdots \\ h_{1L} & \cdots & h_{ML} \end{bmatrix} \quad (1)$$

where $h_{ml}$ denotes an l-th multipath signal among channels from an m-th transmitting antenna.

The channel state H is estimated in the RF and baseband processor 152. In this case, channel estimation can be accomplished by any conventional channel estimation method. First, the feedback information approximation unit 156 obtains a weight to be multiplied by L transmitting antennas from the estimated channel state. The weighting unit 106 of the transmitter 100 weights an information signal with the feedback information restored in the feedback information restoring unit 110, which allows the channel state to be reflected in the information signal before transmitting the information signal, and thus reduces multipath fading.

The optimum transmitting antenna weight calculated from the estimated channel state is given by a vector W that maximizes an objective function P as expressed by Equation (2):

$$P=W^H H^H W \qquad (2)$$

where superscript H denotes a Hermitian operator and W is a vector representing the transmitting antenna weight. The vector W is expressed by Equation (3):

$$W=[W_1, W_2, \ldots W_M]^T \qquad (3)$$

where $W_m$ denotes a weight of the m-th transmitting antenna and T denotes a transpose of a matrix.

An optimum transmitting antenna weight $W_{opt}$ may be calculated from the vector W that maximizes P as defined by Equation (2). The optimum weight $W_{opt}$ is given by an eigenvector corresponding to a maximum eigenvalue of $H^H H$.

If the number of transmitting antennas is M and the number of receiving antennas is M', an optimum transmitting antenna weight $W_{opt}$ may be obtained by extending the above. Thus, the optimum weight $W_{opt}$ has a number of elements corresponding to M transmitting antennas for an arbitrary number of receiving antennas. In the present invention, the M-dimensional optimum transmitting antenna weight $W_{opt}$ is approximated as lower-dimensional one to calculate feedback information.

The optimum weight $W_{opt}$ is an M-dimensional vector where M is equal to the number of transmitting antennas, and each element generally is a complex number. Thus, $W_{opt}$ is considered as a point in an M-dimensional space, and the point can be represented by base vectors for representing M-dimensions and complex number coefficients corresponding to each base vector.

For example, assuming that $W_{opt}=[a, b, c]^T$, and basis vectors are represented by $B_1=[1\ 0\ 0]^T$, $B_2=[0\ 1\ 0]^T$, and $B_3=[0\ 0\ 1]^T$, a three-dimensional vector $W_{opt}$ can be expressed with the basis vectors and coefficients as in Equation (4):

$$W_{opt}=a \cdot B_1+b \cdot B_2+c \cdot B_3 \qquad (4)$$

FIGS. 2A–2D illustrate examples of lower-dimension approximations of $W_{opt}$ by projection. If $W_{opt}$ 200 is a weight before approximation, $W_{opt}$ 200 requires at least three basis vectors in order to represent three-dimensional information. It is assumed that basis vectors $B_1$ 202, $B_2$ 204, and $B_3$ 206 have the magnitude of 1 and are orthogonal to each other. By the above assumption, coefficients $c_1$, $c_2$, and $c_3$ of the $W_{opt}$ 200 can be calculated by taking the inner product of $W_{opt}$ 200 and each basis vector. Thus, $W_{opt}$ can be calculated as expressed by Equation (5):

$$W_{opt}=c_1 B_1+c_2 B_2+c_3 B_3 \qquad (5)$$

Here, if coefficients $c_1$, $c_2$, and $c_3$ satisfy $|c_1|>|c_2|>|c_3|$, the component of $W_{opt}$ in the direction of $B_1$ is the largest of the three components shown in Equations (5).

Figure 2A:
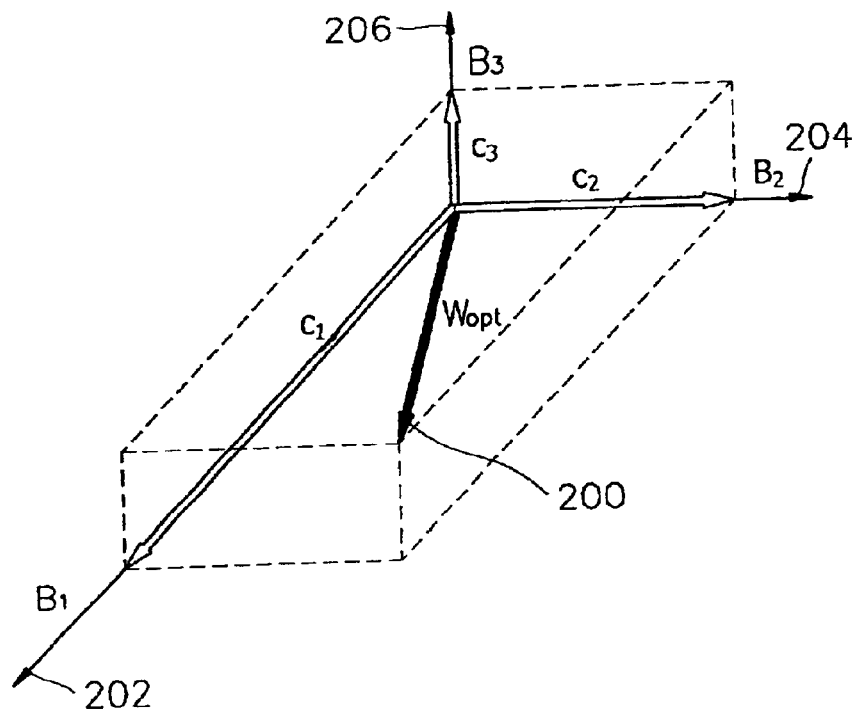
FIGS. 2A–2D illustrate examples of lower-dimension approximations by projection.
Figure 2B:
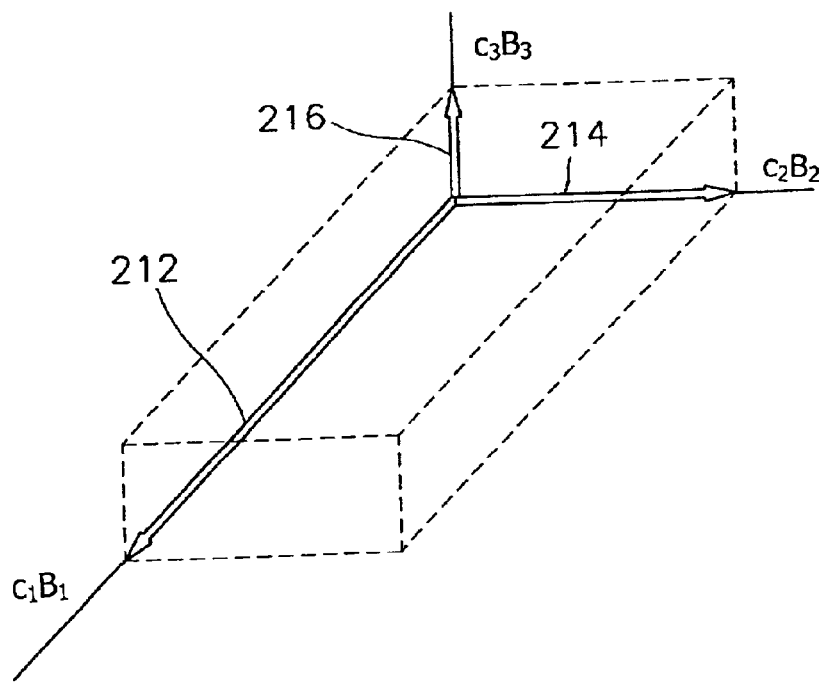
Figure 2C:
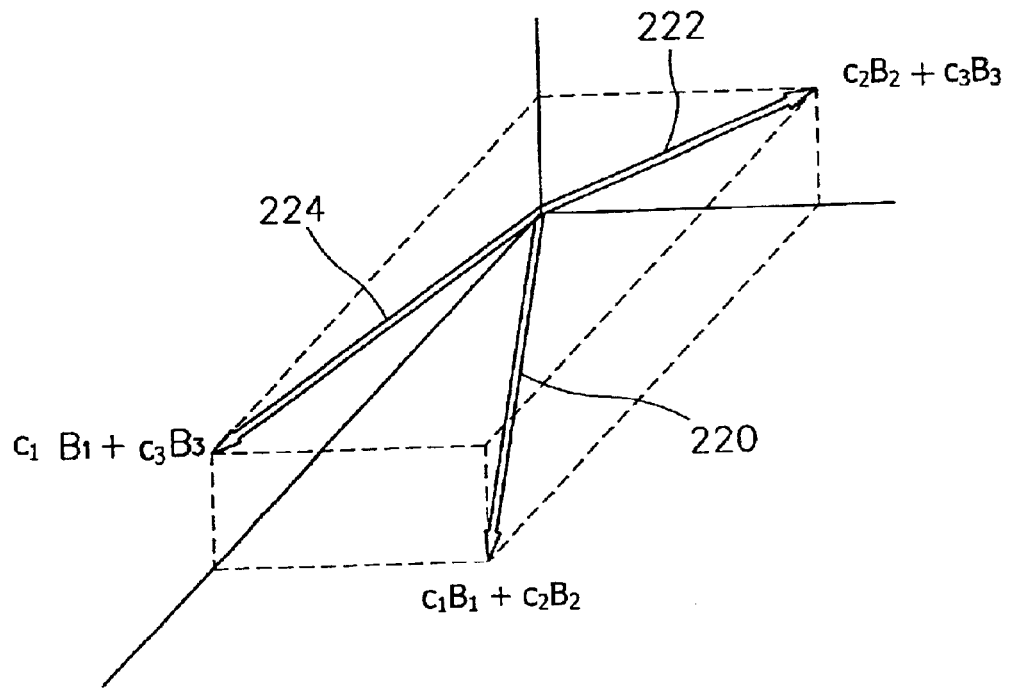
Figure 2D:
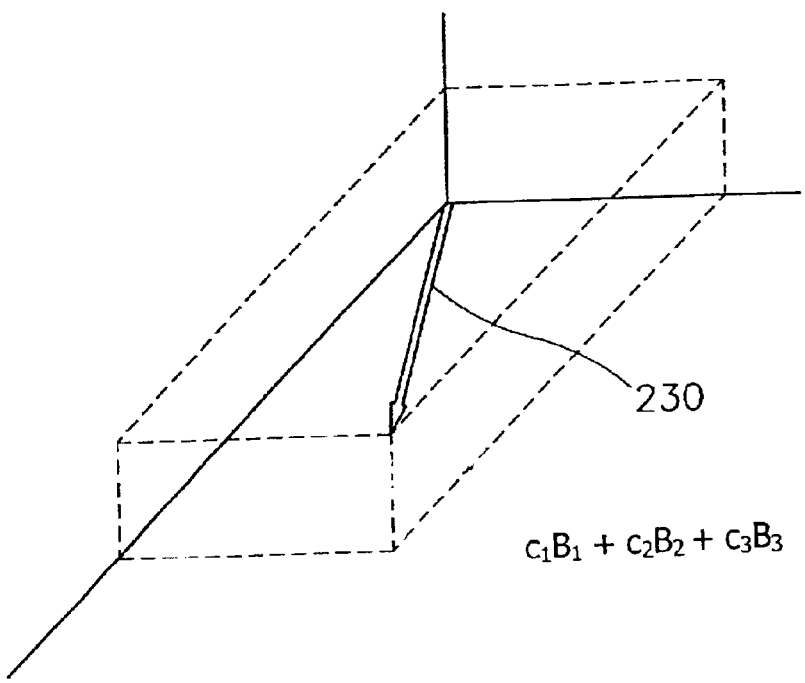

FIG. 2A illustrates $W_{opt}$ 200 and its projection on each basis vector $B_1$ 202, $B_2$ 204, or $B_3$ 206, and FIG. 2B illustrates a case in which $W_{opt}$ is approximated as one-dimensional information. In this case, three approximations are available and they are $c_1 B_1$ 212, $c_2 B_2$ 214, and $c_3 B_3$ 216. However, if the coefficients $c_1$, $c_2$, and $c_3$ satisfy $|c_1|>|c_2|>|c_3|$, the optimum one-dimensional approximation of $W_{opt}$ is $c_1 B_1$ 212. FIG. 2C illustrates a two-dimensional approximation. Approximations of $W_{opt}$ are represented by $c_1 B_1+c_2 B_2$ 220, $c_2 B_2+c_3 B_3$ 222, and $c_1 B_1+c_3 B_3$ 224. If the coefficients $c_1$, $c_2$, and $c_3$ satisfy $|c_1|>|c_2|>|c_3|$, the optimum two-dimensional approximation of $W_{opt}$ may be represented by $c_1 B_1+c_2 B_2$ 220. FIG. 2D shows a three-dimensional approximation 230. In this case, approximation of $W_{opt}$ is only one, $c_1 B_1+c_2 B_2+c_3 B_3$ 230 which is exactly the same as $W_{opt}$.

A set of basis vectors required for approximation of weight are employed to represent the dimensionality of $W_{opt}$. Thus, a set of various basis vectors can be employed for approximation of weight. Here, the basis vectors may not be orthogonal to each other, but if they are orthogonal to each other, superposition of information can be avoided.

FIGS. 3(a)–3(f) illustrate a set of basis vectors required for approximation of a weight. FIGS. 3(a), 3(c), and 3(e) show two-, three-, and four-dimensional orthogonal basis vectors, respectively, where each component of the basis vectors represents whether or not each antenna is used. For example, selecting two dimensional basis vector [1 0] means that a signal is transmitted through a first one of two antennas, while selecting [0 1] means that a signal is transmitted through a second one.

FIGS. 3(b), 3(d), and 3(f) show another example of two-, three-, and four-dimensional orthogonal basis vectors, respectively, in which each basis vector maintains orthogonality while keeping a difference in power between each antenna to a minimum.

Figure 4:
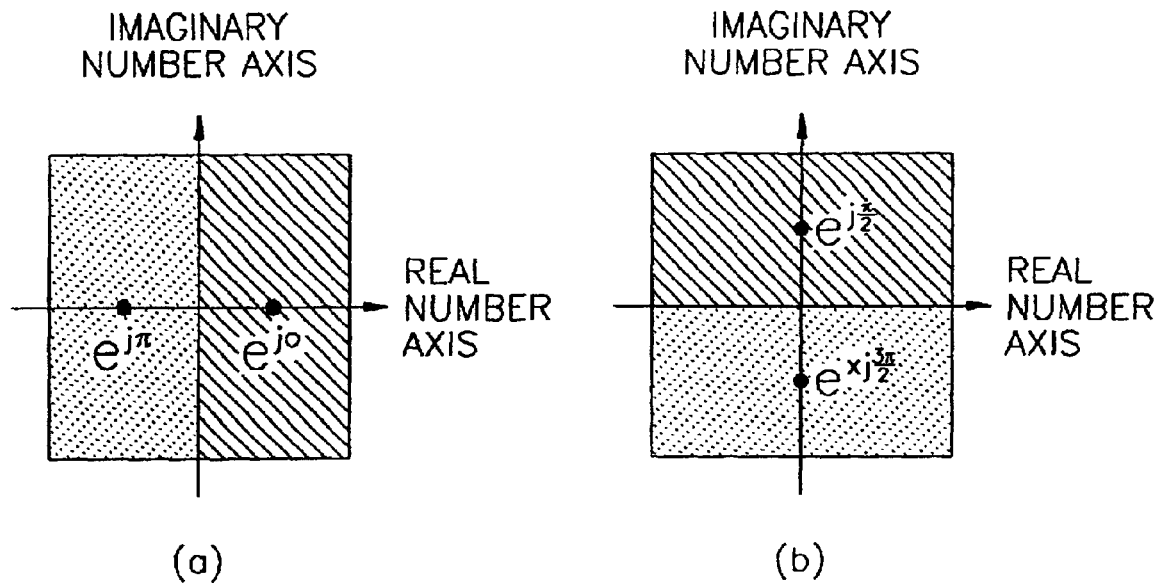
FIGS. 4(a) and 4(b) illustrate examples of quantizations for complex number coefficients.

The approximation of a weight further requires a coefficient corresponding to each basis vector. In this invention, each coefficient is represented by a real number or a complex number and subjected to quantization for feedback. FIGS. 4(a) and 4(b) show examples of quantizations of a complex number coefficient. FIG. 4(a) shows an example in which a coefficient is quantized to two levels depending on the sign of a real part of the coefficient. If the real part of the coefficient is a positive number, the coefficient is quantized to a representative value $e^{j0}$, while if the real part is a negative number, the coefficient is quantized to a representative value $e^{jH}$. FIG. 4B shows another example of two-level quantization, in which a coefficient is quantized depending on the sign of the imaginary part of the coefficient.

Figure 5A:
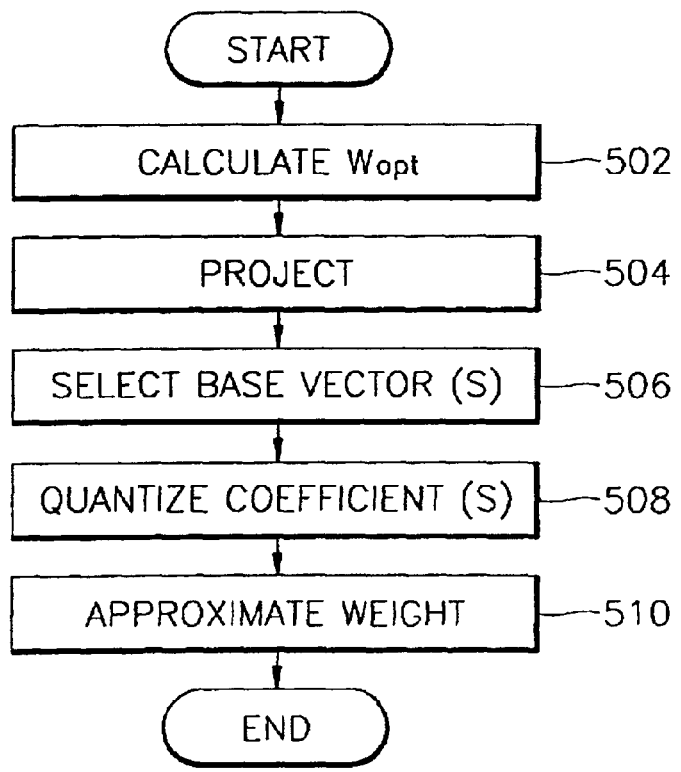
FIG. 5A illustrates a method of approximating feedback information by projection.
Figure 5B:
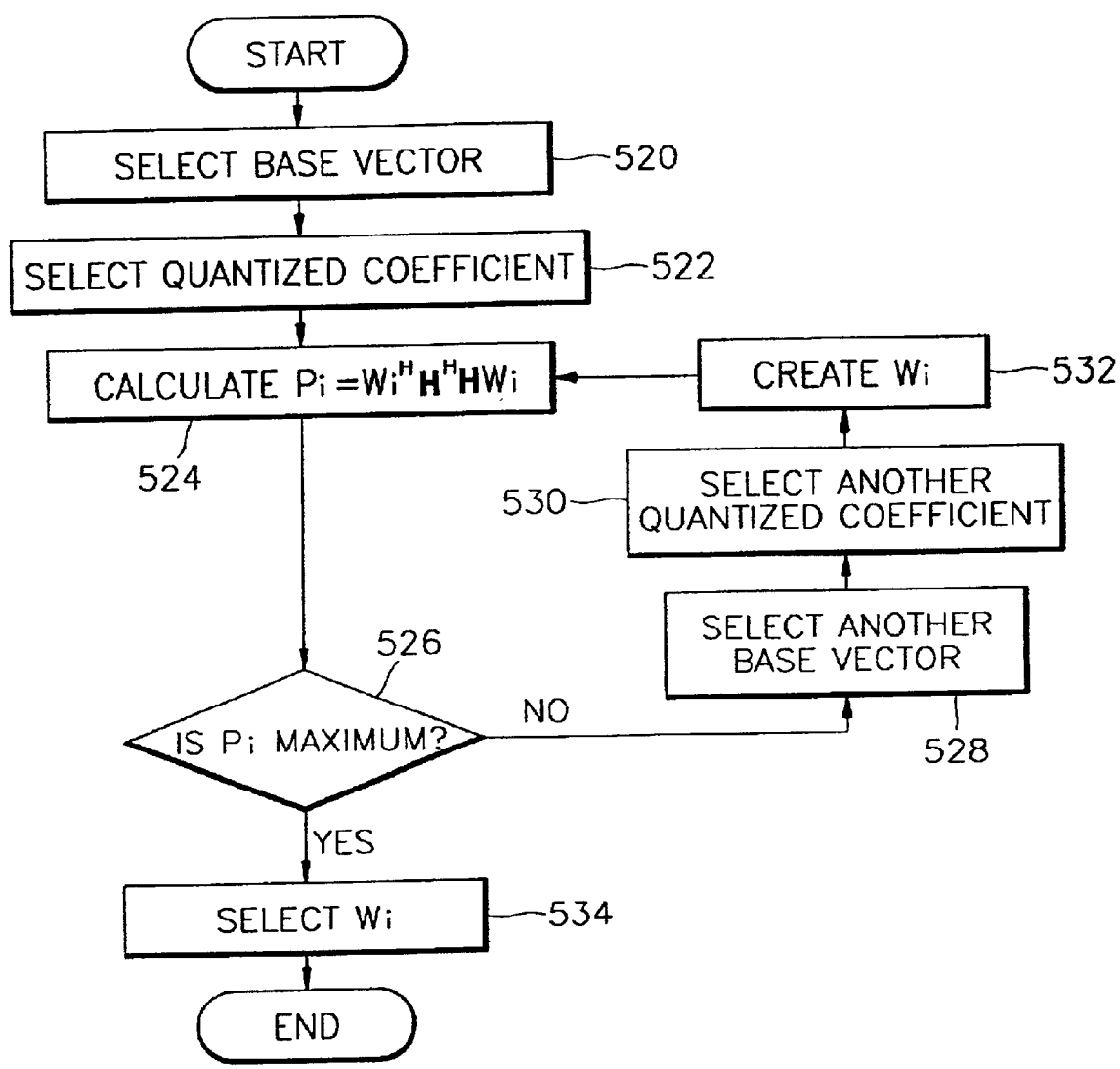
FIG. 5B illustrates a method of approximating feedback information by searching.

FIGS. 5A and 5B illustrate flowcharts showing algorithms for approximating a weight according to the above process. FIG. 5A illustrates an approximation by projection while FIG. 5B illustrates an approximation by searching. It is assumed in this embodiment that the number of transmitting antennas is M, S-dimensional approximation is performed, and the quantization level of a coefficient is N.

Referring to FIG. 5A, which illustrates a method of approximating a weight by projection, first, an optimum transmitting antenna weight $W_{opt}$ is calculated (step 502). The calculated weight $W_{opt}$ is projected onto each basis vector, that is, coefficients are calculated by taking inner product of $W_{opt}$ and each basis vector (step 504). A number S of coefficients are selected in order of their magnitudes, and then basis vectors corresponding to the selected coefficients are selected (step 506). Next, the selected coefficients are quantized (step 508). A weight is approximated as lower-dimensional one using the selected basis vectors and the quantized coefficients (step 510).

Referring to FIG. 5B, which shows a method of approximating a weight by searching. First, S of M basis vectors are selected (step 520). One of N quantized coefficients is selected for each of the selected S basis vectors (step 522). A weight $W_i$ is calculated from the selected basis vectors and coefficients, and $P_i=W_i^H H^H H W_i$ in Equation (2) is calculated using H in Equation (1) (step 524). Here, H denotes a channel state estimated in the RF and baseband processor 152. Then, it is determined whether $P_i$ is a maximum (step 526), and if $P_i$ is a maximum value, $W_i$ is selected (step 534). If not, other basis vectors and quantized coefficients are selected (steps 528 and 530) to form $W_i$ (step 532). The above process is repeated for the generated $W_i$, so that the step 530 is repeated for $N^S$ cases and the step 528 is repeated for $_MC_S$ cases.

Outputs from the feedback information approximation unit 156 may be indices that identify the quantization coefficients according to the method of approximating a weight.

Table 1 shows an example in which quantization coefficients are represented by indices and the indices are digitally represented assuming that a quantization level is 2.

TABLE 1

| Quantization coefficient | Index | Digital representation |
|---|---|---|
| $e^{j0}$ | 1 | 00 |
| $e^{j\pi/2}$ | 2 | 01 |
| $e^{j\pi}$ | 3 | 11 |
| $e^{j3\pi/2}$ | 4 | 10 |

Similarly, information about basis vectors may be represented by indices of selected basis vectors. Table 2 shows a process by which the selected basis vectors are represented by indices assuming that the number of the transmitting antennas 120 in the transmitter 100 is 4 and one-dimensional approximation is used. $[1000]^T$, $[0100]^T$, $[0010]^T$, and $[0001]^T$ are selected as basis vectors.

TABLE 2

| Selected basis vector | Index | Digital representation |
|---|---|---|
| $[1000]^T$ | 1 | 00 |
| $[0100]^T$ | 2 | 01 |
| $[0010]^T$ | 3 | 11 |
| $[0001]^T$ | 4 | 10 |

Furthermore, assuming that a two-dimensional approximation is applied with other conditions being equal, the number of possible combinations of basis vectors which can be selected is six and the selected basis vectors are represented by three-bit data. Table 3 shows an example for this case.

TABLE 3

| Selected basis vectors | Index | Digital representation |
|---|---|---|
| $[1000]^T$, $[0100]^T$ | 1 | 000 |
| $[1000]^T$, $[0010]^T$ | 2 | 010 |
| $[1000]^T$, $[0001]^T$ | 3 | 110 |
| $[0100]^T$, $[0010]^T$ | 4 | 111 |
| $[0100]^T$, $[0001]^T$ | 5 | 011 |
| $[0010]^T$, $[0001]^T$ | 6 | 001 |

As described above, a weight which is approximated as lower-dimensional one is composed of basis vectors that constitute a lower dimension and coefficients corresponding thereto. Thus, if the basis vectors, the coefficients corresponding thereto, and indices indicating them are already stored in the transmitter 100 in the form of a table, the indices can be transmitted to the transmitter 100. The feedback information restoring unit 110 of the transmitter 100 can extract from the stored table the basis vectors and the quantization coefficients corresponding to the received indices.

Obtaining feedback information by approximating a weight according to this invention can reduce the amount of feedback information. For example, assuming that a complex number coefficient for each dimension is represented by four bits, 12-bit feedback information is needed if an unapproximated weight of 4-dimension is transmitted as feedback information. In this case, one dimension coefficient does not need any feedback because the overall transmit power of a transmitting antenna is fixed to eliminate the need for sending information about the magnitude of one dimension coefficient and phase information about each antenna can be represented relatively to a basis antenna.

According to a feedback method using approximation, the number of bits is divided into two different kinds, one is for representing the type of basis vector used in approximation and the other is for representing a coefficient. First, in case of one-dimensional approximation, the number of bits required for representing all possible cases in which one of four basis vectors is selected is 2, in which case there is no need for feedback information representing a coefficient since the coefficient is fixed as 1. Thus, 2 bits are needed. Second, in case of a two-dimensional approximation, the number of cases in which two of four basis vectors can be selected is 6. The six cases are represented by three bits. In this case, the quantization coefficient for the first dimension does not need any feedback and the quantization coefficient for the second dimension is represented by four bits. Thus, 7 bits for feedback information are needed. Third, in case of a three-dimensional approximation, the number of cases in which three of four basis vectors can be selected is four. 2 bits are required in representing the four cases, and 8 bits are required in representing quantization coefficients. Thus, the total 10 bits for feedback information are needed. Last, in case of a four-dimension approximation, 12 bits are needed. Accordingly, it comes clear that the lower the dimensionality of approximation is, the less the amount of feedback information is. Furthermore, in all cases, to which approximation is applied, the amount of feedback information is less than or equal to that required when no approximation is performed. In Table 4, the amount of feedback information when the approximation method is used is compared with that required when no approximation is not performed. As is evident from Table 4, approximation to lower dimensions reduces the amount of information more than when no approximation technique is applied.

TABLE 4

| Dimensionality of approximation | Approximation method | Non-approximation method |
|---|---|---|
| 1 | 2 Bits | 12 Bits |
| 2 | 7 Bits | |
| 3 | 10 Bits | |
| 4 | 12 Bits | |

According to the present invention, the amount of feedback information is reduced in a communication system with feedback having multiple transmitting/receiving antennas, thereby using channels required for feedback more effectively and reducing a delay time caused by feedback. Furthermore, the amount of feedback information is reduced to an optimum level, thereby minimizing the degradation of performance caused by approximation.

While the present invention has been described in terms of preferred embodiments, those of ordinary skill in the art will recognize that various modifications may be made to the present invention without departing from the spirit and scope thereof.

What is claimed is:

1. A wireless communication system including a plurality of transmitting antennas and a plurality of receiving antennas through which signals are transmitted and received, the wireless communication system comprising:

a transmitter that restores a first feedback information from a predetermined feedback signal, weights an information signal with the first feedback information, and converts the weighted information signal to a first radio frequency signal in order to transmit the first radio frequency signal; and a receiver that receives the first radio frequency signal to estimate a state of a channel through which the first radio frequency signal is transmitted, calculates a first weight of a first dimensionality corresponding to a number of the plurality of transmitting antennas from the estimated channel state, approximates the first weight to a second weight having a second dimensionality the second dimensionality being lower than the first dimensionality, to extract a second feedback information, and converts the second feedback information into a second radio frequency signal to send the second radio frequency signal to the transmitter.

2. The wireless communication system as claimed in claim 1, wherein the receiver comprises:

a baseband processor that extracts a baseband signal from the first radio frequency signal and estimates the channel state;

a feedback information approximation unit that calculates the first weight of the first dimensionality, which maximizes a predetermined objective function, and approximates the first weight to the second weight to extract the second feedback information; and a feedback unit that sends the second feedback information back to the transmitter.

3. The wireless communication system as claimed in claim 2, wherein the predetermined objective function is $P=W^H H^H H W$, where a matrix H denotes the channel state, a vector W denotes the first weight, and the superscript H denotes a Hermitian operator, the feedback information approximation unit calculates an optimum first weight $W_{opt}$ that maximizes the predetermined objective function and approximates the optimum first weight $W_{opt}$ to an optimum second weight constituted by a predetermined basis vectors to extract the feedback information.

4. The wireless communication system as claimed in claim 3, wherein $W_{opt}$ is an eigenvector corresponding to a maximum eigenvalue of $H^H H$ in the predetermined objective function.

5. The wireless communication system as claimed in claim 1, wherein the transmitter comprises:

a feedback information restoring unit that restores the first feedback information from the second radio frequency signal received from the receiver;

a baseband processor that encodes and modulates the information signal;

a weighting unit that multiplies the first feedback information by an output signal of the baseband processor; and a radio frequency processor that converts an output signal of the weighting unit to the first radio frequency signal to output the first radio frequency signal.

6. The wireless communication system as claimed in claim 5, wherein the predetermined objective function is $P=W^H H^H H W$, where a matrix H denotes the channel state, a vector W denotes the first weight, and the superscript H denotes a Hermitian operator, the feedback information restoring unit calculates an optimum first weight $W_{opt}$ that maximizes the predetermined objective function and approximates the optimum first weight $W_{opt}$ to an optimum second weight constituted by a predetermined basis vectors to extract the feedback information.

7. The wireless communication system as claimed in claim 5, wherein $W_{opt}$ is an eigenvector corresponding to a maximum eigenvalue of $H^H H$ in the predetermined objective function.

8. A wireless communication system including a plurality of transmitting antennas and a plurality of receiving antennas through which signals are transmitted and received, respectively, the wireless communication system comprising:

a transmitter that restores a first feedback information from a predetermined feedback signal, weights an information signal with the first feedback information, and converts the weighted information signal into a first radio frequency signal in order to transmit the first radio frequency signal; and a receiver that receives the first radio frequency signal to estimate the state of a channel through which the first radio frequency signal is transmitted, selects a number of basis vectors and their coefficients corresponding to a dimensionality of approximation among the basis vectors whose number corresponds to a number of the plurality of transmitting antennas, obtains a plurality of weights from the selected basis vectors and coefficients, extracts a weight that maximizes a predetermined objective function obtained from the estimated channel state among the plurality of weights as a second feedback information, and converts the second feedback information into a second radio frequency signal in order to send the second radio frequency signal to the transmitter as the predetermined feedback signal.

9. The wireless communication system as claimed in claim 8, wherein the receiver comprises:

a baseband processor that extracts a baseband signal from the first radio frequency signal and estimates the channel state;

a feedback information approximation unit that selects the number of basis vectors and their coefficients corresponding to the dimensionality of approximation among the basis vectors whose number corresponds to the number of the transmitting antennas, obtains the plurality of weights from the selected basis vectors and coefficients, extracts the weight that maximizes the predetermined objective function obtained from the channel state among the plurality of weights as the second feedback information; and a feedback unit that sends the second feedback information back to the transmitter.

10. The wireless communication system as claimed in claim 9, wherein the predetermined objective function is $P_i=W_i^H H^H H W_i$, where a matrix H denotes the channel state, a vector $W_i$ is a weight calculated from i-th selected basis vector and coefficient, and the superscript H is a Hermitian operator, the feedback information approximation unit extracts the weight $W_i$ that maximizes the predetermined objective function as the second feedback information.

11. A wireless communication method in which, when M radio frequency signals transmitted from a transmitter are received through multiple paths, a feedback information is extracted from received signals and the extracted feedback information is sent to the transmitter, the method comprising the steps of:

(a) estimating states of channels of the multiple paths from the received signals;

(b) calculating a weight, which is fed back into the transmitter and multiplied by the M radio frequency signals, from the estimated channel state;

(c) approximating the weight to a weight of dimension S which is less than M and quantizing coefficients for the approximated dimension; and (d) feeding basis vectors and their quantized coefficients or indices that identify the basis vectors and their quantized coefficients of the approximated dimension back to the transmitter.

12. The method as claimed in claim 11, wherein, in the step (b), when the number of multiple paths is L, $W_{opt}$ that maximizes a predetermined objective function expressed by $P=W^H H^H HW$ is extracted as the feedback information, where a matrix H having a size of L×M denotes the channel state, a vector W having magnitude of M denotes the weight, and the superscript H denotes a Hermitian operator.

13. The method as claimed in claim 12, wherein the step (c) comprises the steps of:

(c1) determining the basis vectors that represent the M dimensions;

(c2) calculating the coefficients corresponding to the basis vectors from a dot product of the $W_{opt}$ and each basis vector;

(c3) selecting S coefficients among the coefficients calculated in the step (c2) in order of magnitude and selecting the basis vectors corresponding to the selected S coefficients; and (c4) quantizing the selected coefficients.

14. The method as claimed in claim 11, when the feedback signal includes the basis vectors and the quantized coefficients in the step (d), further comprising the steps of:

(e) extracting the basis vectors and the quantized coefficients from the feedback information received from the transmitter;

(f) restoring feedback information from the extracted basis vectors and the quantized coefficients;

(g) weighting an information signal to be transmitted with the restored feedback information; and (h) transmitting the weighted information signal.

15. The method as claimed in claim 11, when the feedback information includes the indices in the step (d), further comprising the steps of:

(e) storing the basis vectors and the quantized coefficients of S dimensions and indices identifying the basis vectors and the quantized coefficients, respectively, in the transmitter;

(f) extracting the indices from a received feedback signal and basis vectors and quantized coefficients identified by the indices among the basis vectors and the quantized coefficients stored in the step (e);

(g) restoring the feedback information from the extracted basis vectors and the quantized coefficients;

(h) weighting an information signal to be transmitted with the restored feedback information; and (i) transmitting the weighted information signal.

16. A wireless communication method in which, when M radio frequency signals transmitted from a transmitter are received through multiple paths, a feedback information is extracted from received signals and the extracted feedback information is sent to the transmitter, the method comprising the steps of:

(a) estimating states of channels comprising the multiple paths from the received signals;

(b) determining basis vectors that represent M dimensions;

(c) selecting S basis vectors among the determined basis vectors, where S is less than M;

(d) selecting one of N quantization coefficients for each basis vector;

(e) obtaining feedback information $W_i$ from the selected basis vectors and quantization coefficients; and (f) sending $W_i$ or an index indicating $W_i$ back to the transmitter when a predetermined objective function $P_i$ generated from $W_i$ and the estimated channel H reaches a maximum.

17. The method as claimed in claim 16, wherein the predetermined objective function $P_i$ is expressed by $P_i=W_i^H H^H H W_i$ where the superscript H is a Hermitian operator.

18. The method as claimed in claim 16, wherein, when the predetermined objective function $P_i$ does not reach a maximum, the steps (e) and (f) are repeated for $_MC_S$ cases in which another S basis vectors are selected from the M basis vectors and for $N^S$ cases in which another quantization coefficient is selected for each of the selected S basis vectors.

19. The method as claimed in claim 16, when the extracted feedback information includes $W_i$ in the step (f), further comprising the steps of:

(g) extracting $W_i$ from the received feedback signal;

(h) weighting the information signal to be transmitted with the extracted $W_i$; and (i) transmitting the weighted information signal.

20. The method as claimed in claim 16, when the feedback information includes the index in the step (f), further comprising the steps of:

(g) storing selectable $W_i$ and index indicating $W_i$ in the transmitter;

(h) extracting the index from a received feedback signal and $W_i$ identified by the index;

(i) weighting an information signal to be transmitted with the extracted $W_i$; and (j) transmitting the weighted information signal.

* * * * *